July 9, 1935.  E. J. PANISH  2,007,658
VALVE CONTROL
Filed Feb. 17, 1930  4 Sheets-Sheet 1

July 9, 1935.　　　　　E. J. PANISH　　　　　2,007,658
VALVE CONTROL
Filed Feb. 17, 1930　　　4 Sheets-Sheet 2

INVENTOR.
Erwin J. Panish.
BY
ATTORNEY

July 9, 1935.  E. J. PANISH  2,007,658
VALVE CONTROL
Filed Feb. 17, 1930   4 Sheets-Sheet 3

INVENTOR.
Erwin J. Panish,
BY
ATTORNEY

Fig.6.

Patented July 9, 1935

2,007,658

UNITED STATES PATENT OFFICE 2,007,658

VALVE CONTROL

Erwin J. Panish, Bridgeport, Conn.

Application February 17, 1930, Serial No. 428,961

13 Claims. (Cl. 137—139)

This invention relates to valve controls, and more particularly, to valve controls having means for rendering the motor inoperative upon cessation of movement of the valve, such, for instance, as disclosed in my application, Serial No. 251,451, filed February 2, 1928, now Patent No. 1,747,594.

In the device disclosed in my said application, the means for rendering the motor inoperative to continue to apply power to the valve or valve-actuating mechanism could be variably set so that the motor would be rendered inoperative immediately upon the disk reaching its seat, or when the closing movement of the disk is interrupted by an obstruction in its path. Or the means could be so set that the motor would be rendered inoperative upon the application of a certain torque to the valve-actuating mechanism which torque would be so predetermined as to be slightly less than that which could safely be applied to the valve-actuating parts. In this event the valve could be closed against one-sided pressure. In this case however the valve would be seated with heavy pressure both under normal and emergency conditions resulting in unnecessary seating pressure and wear and tear on the parts for the normal operations of the valve.

An object of the present invention is to provide means whereby the valve may be seated under normal conditions with a predetermined amount of torque and the resulting normal seating pressure, and yet may be closed under abnormal or emergency conditions, such, for instance, as might occur from a break in the line causing one-sided pressure on the valve, requiring a greater amount of torque to overcome the one-sided pressure on the disc. Of course, under such circumstances, the pressure with which the valve disk seats will not be abnormal, because the power applied by the motor is partly consumed in overcoming the frictional resistance of the valve disk in its guides due to the one-sided pressure condition.

This may be accomplished, according to the present invention, in several ways—one way being the automatic variation or adjustment of the means for determining the torque which the motor may apply to the valve-actuating mechanism by means responsive to one-sided pressure conditions, as disclosed in my application Serial No. 428,962, now Patent #1,856,927 filed on even date herewith.

In the present embodiment of the invention disclosed herein, this is accomplished by providing a manually initiated emergency valve-closing device adapted to permit abnormal torque to be applied by the motor under emergency conditions, and, in the form of the invention herein illustrated, comprises, in addition to the normal valve-control station, an emergency station containing a valve-closing button, and means for rendering the normal valve control station inoperative as an incident or preparatorily to the operation of the emergency button.

Another feature of the present invention is the provision of means for completely rendering the normal control station inoperative when the emergency station is used, so that any person, not knowing of the emergency requiring a quick closing of the valve, may not defeat the desired purpose by attempting to open or stop the valve by means of the normal control station.

A further feature is to provide means whereby a separate and distinct manual operation must be performed to recondition the control system so that it may again be operative from the normal control station.

In the specific embodiment of this invention illustrated herein, the motor is rendered inoperative by a switch in the system which is opened by movement of one part of the valve-actuating mechanism relative to another as the result of a predetermined torque being applied by the motor to the valve-actuating mechanism under normal operating conditions.

For emergency conditions, another switch is provided and arranged in the circuit so as to keep the motor operative even though the torque applied by the motor exceeds the said predetermined torque required for normal conditions.

The emergency switch is operated in the same manner as the normal switch, but is set so that the motor will not be rendered inoperative until another predetermined and greater torque, approaching the maximum which may safely be applied to the valve-actuating mechanism or which is required to seat the valve under one-sided pressure, is developed by the motor.

Of course, the normal switch need not necessarily be effected when the emergency switch is in operation, but it is preferable that both switches be made operative by the emergency station so that if one should remain open by accident, the other at least will be closed. This duel circuit arrangement of the present invention is extremely advantageous.

A particularly noteworthy feature of this invention is the provision of an emergency station, the resetting of which, to restore the normal control station to operative condition, requires the attendance of two persons in order to prevent one person from alone and inadvertently restoring the valve control system to normal conditions before orders for such restoration have been given by an authorized person, whose responsibility it is to first determine whether the causes for the emergency closing have been eliminated.

In the accompanying drawings which illustrate one embodiment of this invention, that at present preferred—

The present invention is herein illustrated as applied to the valve opening and closing device described and claimed in my copending application, Serial No. 251,451, filed February 2, 1928, now Patent No. 1,747,594, to which attention is directed for a more complete understanding of the general structure of the valve opening and closing device illustrated herein, like reference numerals being applied to the same parts in said patent and in this application.

Figure 1:
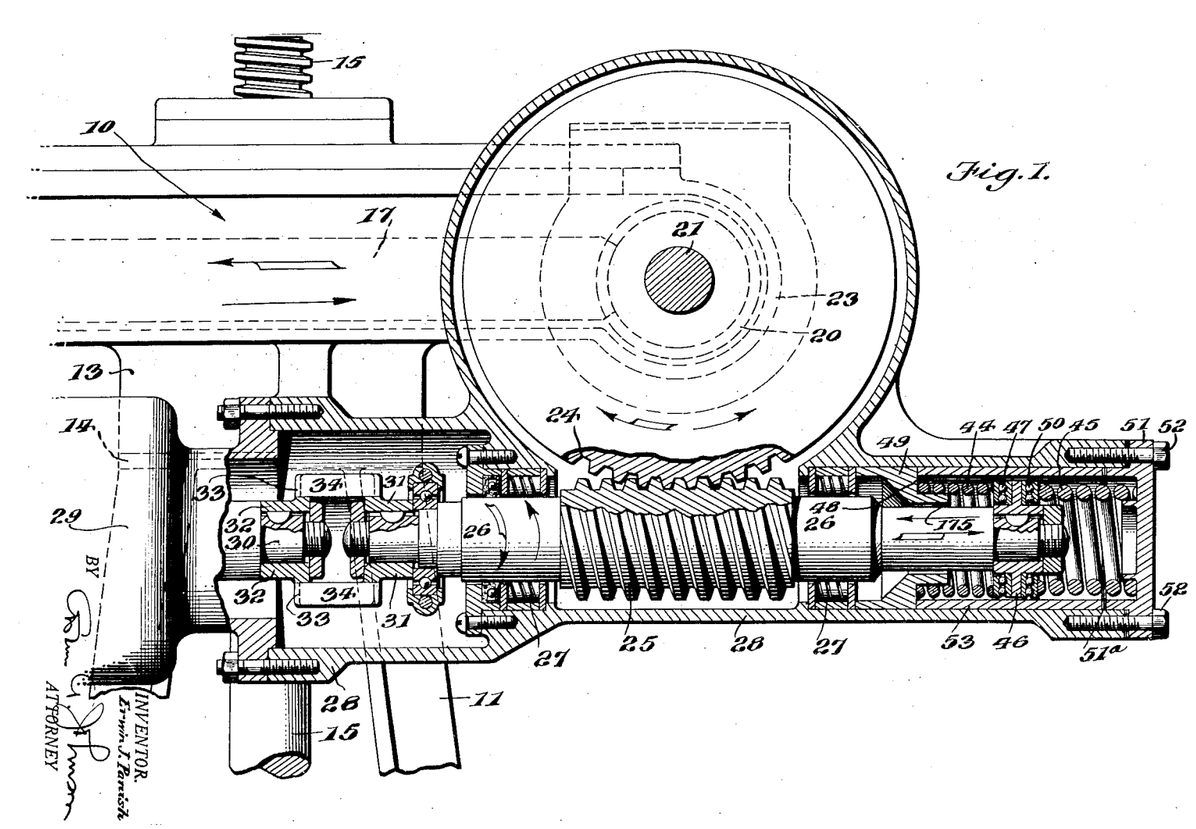
Figure 1 is an elevation of part of the valve arch showing the valve control device with part of the casing removed or broken away to show in detail parts of the driving train and other important parts, some of which are shown in section.

The device to which the present invention is applied comprises a casing 10 formed of a number of castings secured together for supporting and concealing various parts of the mechanism, and for supporting the device on the arch 11 or other part of the valve. As shown, the part 13 of the casing 10 is adapted to be bolted to the top 14 of the arch so that the screw-threaded valve-stem 15 passes through the casing, as shown in Fig. 1. In this part 13 of the casing is located the arch-nut which engages the valve-stem 15 and by the rotation of which, in opposite directions, the valve-stem and valve disk are moved up and down to open and close the valve.

To rotate this arch-nut, there is mounted in the part 13 of the casing, concentric with the valve-stem 15, a worm-wheel 17. In the form of the present invention herein shown, the worm-wheel 17 is part of the valve-actuating mechanism, other parts of which are a worm 20 having a shaft 21 carried in bearings in a part 23 of the casing; a worm-wheel 24 supported by and adapted to drive the shaft 21; and a worm 25 having a shaft 26 mounted in bearings 27 carried by a part 28 of the casing 10.

This train of gearing is adapted to be driven by an electric motor 29, whose casing is shown bolted to the end of part 28 of the casing 10, so that the motor shaft 30 is substantially in axial alignment with the worm-shaft 26. The motor shaft 30 is connected to the worm-shaft 26 to drive the same by a coupling which, for facilitating the attachment and removal of a motor and for other purposes herein referred to, preferably is of the sliding type. As shown, this coupling consists of a pair of sleeves 31 and 32 keyed and secured to the shafts 26 and 30 respectively, the sleeve 32 having a pair of slots 33 extending in the direction of and adapted to be engaged by and drive a pair of arms 34 on the sleeve 31. Hence, when a new or replacement motor is being installed, it is merely necessary to see that the arms 34 enter the slots 33, as shown in Fig. 1, before bolting the motor casing to the casing 10; this, without making any mechanical operation to secure the coupling parts together.

For emergency use, in case of lack of current to operate the motor or other electrical difficulties, there may be provided a hand-wheel which may be operated by hand to turn the worm 20 and the worm-wheel 17.

To avoid certain difficulties with valve controls known prior thereto, I have provided, by my invention described and claimed in my Patent No. 1,747,594, means responsive to the reaction produced as a result of cessation of movement of the valve-actuating mechanism while the motor continues to apply power thereto for rendering the motor inoperative to apply power to the valve-actuating mechanism. That is to say, I have provided means for removing the power supplied by the motor to the valve-stem when the torque developed by the motor reaches a value determined in advance with regard to the ultimate torque which can safely be applied to the valve as dictated by sound engineering principles, the mechanism being responsive to one predetermined torque when moving the valve in closing direction and to a different and quantitatively lesser when moving the valve in opening direction, thereby to permit the valve to be brought very gently but firmly against the bonnet bushing of the valve, an operation which was, prior to that time, impossible except by hand operation.

The torque-responsive means of the present invention as illustrated in Fig. 1, is identical with that disclosed in my aforesaid patent, and in it the worm-shaft 26 is not held against all end-thrust movements, but instead the bearings 27 are adapted to permit such movement in both directions, which movement is further permitted by the sliding coupling 31—32 between the shaft 26 and the motor shaft 30. Normally, the shaft 26 is held in condition of substantially stable equilibrium between limits of movement endwise, by a pair of springs 44 and 45 located on opposite sides of a disk 46 secured to the shaft 26.

The spring 44 is located between an antifriction thrust bearing 47 and a shoulder 48 on a sleeve 49 carried in the part 28 of the casing 10, and the spring 45 is located between another antifriction thrust bearing 50 on the disk 46 and a cover plate 51 adapted to be secured to the part 28 of the casing 10 by bolts 52. When assembling the device, a sleeve 53 is placed in the part 28 of the casing, so that as the bolts 52 are drawn up, the cover plate 51 will force the sleeve 53 inwardly moving the sleeve 49 until it strikes the bearing 27 to firmly hold the latter in the position shown in Fig. 1. To permit adjustment of the tension of the springs 44 and 45, shims 51a may be inserted between or removed from between the sleeve 53 and the cover plate 51.

The springs 44 and 45 are, of course, manufactured so as to have the desired amount of initial tension when assembled. This tension is such that without load the shaft 26 assumes the position shown in Fig. 1. When, however, work is performed by the valve-actuating mechanism as when opening or closing the valve, the shaft 26 moves endwise within its limits an extent dependent upon the resistance which the valve may offer to movement. During ordinary conditions, after movement of the valve has been started and before seating, the shaft 26 moves endwise very little, for the springs 44 and 45 are made stiff enough to prevent any appreciable endwise movement of the shaft under ordinary running load condition.

The gear train of the valve-actuating mechanism is such that the gears travel in the directions of the feathered arrows shown in Fig. 1, when the valve is being closed. Consequently, when the valve-disk becomes seated or when it meets an irresistable obstruction, the increased load resulting therefrom, or the actual stopping of the gear train including the worm-wheel 24, causes the worm 25 to screw through the teeth of the worm-wheel 24, and hence moves axially in the direction of the feathered arrow shown in Fig. 1, thus compressing the spring 45. When the valve is being opened, the motor shaft 30 rotates in the opposite direction, and hence the gears move in the direction of the tailless arrows shown in Fig. 1. When the parts rotate in these directions, should a load greater than that which is predetermined be applied to the valve-actuating mechanism, the worm 25 will move to the left, as seen in Fig. 1 and shown by the tailless arrow therein. At this time the spring 44 is compressed. During compression of either spring 44 or spring 45, no appreciable action, tending to brake the motion of the worm 25 and its shaft 26, results because of the provision of the anti-friction thrust bearings 47 and 50 interposed between the springs 44 and 45 respectively and the disk 46.

Hence it will be seen that means are provided for imparting endwise movement to a part of the valve-actuating train as a result of changes in loads on the other parts thereof.

This endwise movement of the shaft 26 may, in any suitable way, render the motor 29 inoperative to apply further power to the valve-actuating mechanism, but, in the present invention, the endwise movement of the worm-shaft 26 electrically controls the motor to render it operative or inoperative. Since it is preferable that the valve be controlled from a remote point and since the remote control of the valve mechanism is improved or facilitated by an arrangement of secondary controls, the embodiment of the present invention herein shown does not provide means for directly opening the motor circuit when desired, but does this through the secondary control of the remote control device.

Briefly described, this control mechanism comprises a remote control station having push buttons or other circuit-closing means for actuating a relay switch in the motor circuit, and automatic switches controlled by the end-thrust movements of the worm-shaft 26 for opening the hold-in circuits of the relay switch when a predetermined torque is applied by the motor to the valve-actuating mechanism upon cessation of movement of the valve disk.

In my prior device, the automatic switch controlling the motor operation for valve closing was so set, and the tension of the spring 45 was so predetermined, that the valve disk was seated with one definite, predetermined pressure under all conditions. Nevertheless, that predetermined pressure could be varied by a mechanical readjustment or fixed setting of the parts so that either one of two modes of operation could be obtained.

That is to say, the fixed setting could be such that the motor could apply only such torque as is necessary to close the valve with as light seating pressure as would be required for expected normal operation of the valve, and assuming that the valve would always be operated with the pressures on opposite sides of the valve being balanced. This kind of setting is extremely desirable where feasible. Or, the fixed setting may be such that the motor may apply torque in excess of that normally necessary, so that the valve-disk would be seated under emergency conditions, for instance, against one-sided pressure in the line. This is not desirable, for the valve seats and valve-disk surfaces would be subject to undue and unnecessary wear due to the heavy seating pressures which they will be normally subjected to, when pressures in the line on opposite sides of the valve-disk are balanced.

One of the objects of the present invention is to provide means whereby the motor applies a definite predetermined torque to the valve-actuating mechanism under normal conditions when the seating pressure will be no heavier than necessary for a balanced line condition, and another definite and predetermined torque to the valve-actuating mechanism under abnormal or emergency conditions, sufficiently great to meet all such conditions and yet be within the maximum torque which can safely be applied to all parts of the valve and operating mechanism.

This may be accomplished by mechanically or electrically varying the pressure of the spring 45 which resists endwise movement of the worm-shaft 26 or by delaying the action of the automatic switch for opening the motor control circuits, the latter method being employed in the specific embodiment of the invention illustrated herein.

Another object of this invention is to provide a separate control station for closing the valve under emergency conditions, and in addition to make provision so that when the emergency station is in operation, the normal valve-control station is temporarily rendered inoperative.

Figure 2:
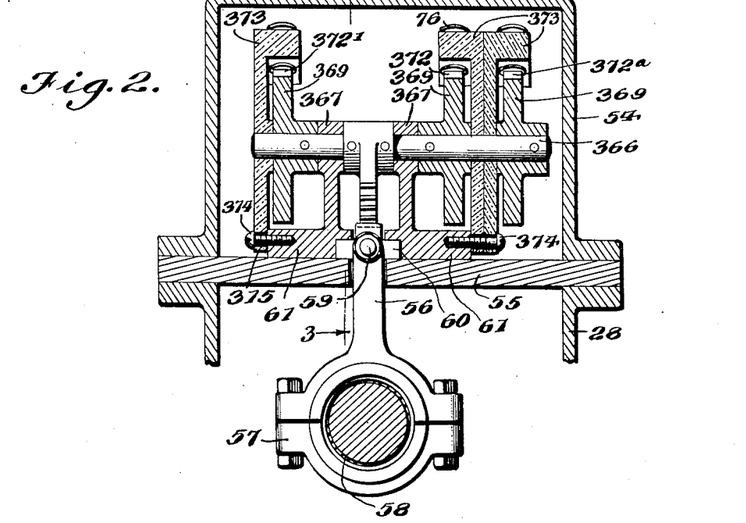
Fig. 2 is a transverse sectional view through the automatic switch mechanism showing its connection to the worm shaft, the end thrust movement of which actuates the switch.
Figure 6:
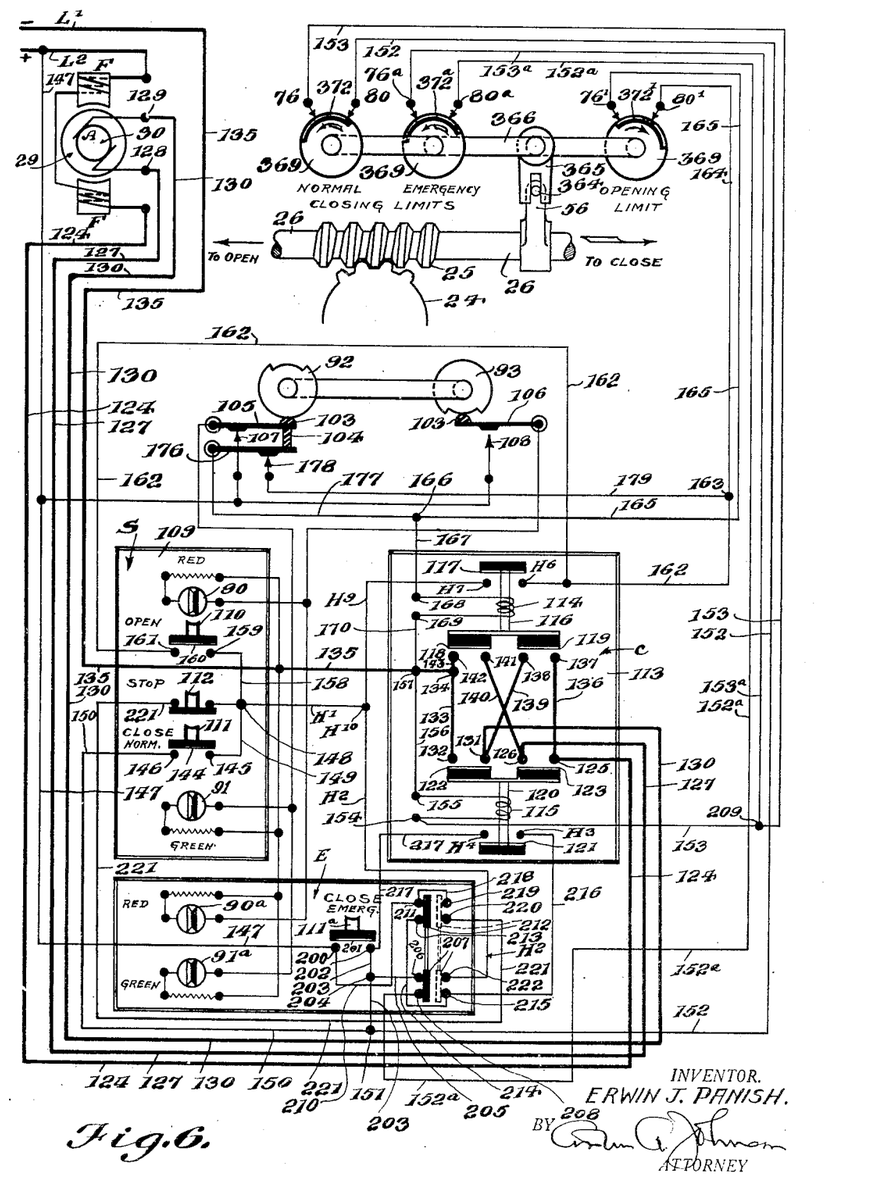
Fig. 6 is a schematic view of parts of the present invention and including a wiring diagram showing how the various parts are connected together electrically.

As in my prior patent, the torque-controlling automatic switches are operatively connected to the worm-shaft 26 by an arm 56 secured thereto (see Fig. 2 and top of the diagram Fig. 6). The automatic switches shown herein are somewhat different from those in my prior device and will now be described.

Figure 3:
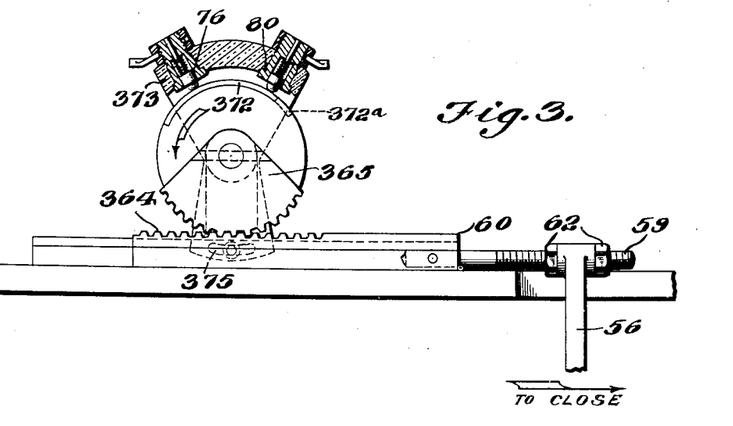
Fig. 3 is a longitudinal sectional view taken approximately on line 3—3 Fig. 2.

This switch mechanism above referred to is mounted in a housing 54 secured upon the part 28 of the casing 10 which encloses the sliding coupling 31—32 and the adjacent end of the worm-shaft 26, the housing 54 being separated from the portion 28 of the casing by a plate 55. The plate 55 is provided with an elongated slot through which passes the arm 56 having a two-part clamp 57 by means of which it is secured to the outer race of a ball-bearing 58, the inner race of which is secured to the worm-shaft 26. Hence, when the worm-shaft 26 moves endwise, the arm 56 is moved in the slot in plate 55. Within the housing 54, the end of the arm 56 is connected by a screw rod 59 with a slide 60 riding on the plate 55 between rails formed by a pair of plates 61.

The rod 59 passes freely through the arm 56, but is held thereto by a pair of nuts 62 by means of which the relative position of the arm 56 and the rod 59 may be adjusted. This adjustment is provided so that the slide 60 may be in a predetermined neutral position at the time that the worm-shaft 26 is in its neutral position as determined by the balance resulting from the action of the springs 44 and 45 against each other. After the device is assembled and before any further adjustments of any kind are made, the nuts 62 are so adjusted on the screw rod 59 that the slide 60 assumes its neutral position, that shown in Fig. 3.

The slide 60 constitutes a gear rack 364 meshing with a segment 365 secured to a shaft 366, the rack and segment being shown diagrammatically by the pin-and-slot connection in diagram Fig. 6, and the arrangement being such that the shaft 366 is rotated in one direction or the other coordinately with the similar end-thrust movements of the worm-shaft 26. The shaft 366 is rotatably mounted in arms 367 extending upwardly from the plates 61 and carries a plurality of disks 369 of insulating material having on their periphery metallic segments 372, 372' and 372a for normal closing, opening and emergency closing circuits respectively. Cooperating with each of these segments respectively is a contact 76 and 80, 76' and 80', and 76a and 80a, each pair of contacts being mounted on a segment 373 supported on the shaft 366 and fixed against rotation by a screw 374 threaded in the plates 61 and passing through arcuate slots 375 in the segments which permit adjustment of the segments 373 relative to each other and to the metallic segments 372, 372' and 372a on the disks 369.

Normally, the segments are in such position as to keep the circuits closed across all three of the pairs of contacts 76 and 80, 76' and 80', and 76a and 80a. Upon cessation of movement of the valve in closing direction, the shaft 366 rotates in a direction of the feathered arrows, Figs. 3 and 6, and when it has moved sufficiently in the normal closing operation to carry the end of the segment 372 away from the contact 80, the motor control circuit including the latter will be opened. However, under emergency conditions, the shaft 366 must rotate still further before the segment 372a passes from under its contact 80a and opens the circuit controlled thereby, and hence a greater endthrust movement of the worm-shaft 26 with a greater compression of the spring 45 is required before the circuit controlled by segment 372a is opened. The motor may therefore apply greater torque to the valve-actuating mechanism before the motor becomes inoperative.

Upon cessation of movement of the valve in opening direction at the bonnet bushing, the switch shaft 366 is rotated in the direction of the tailless arrow resulting in the movement of the segment 372' from under the contact 76', causing the circuit containing the latter to be opened and the motor to be rendered inoperative.

The contact segments 372 and 372a are extended on one side so that their circuits are not opened by the rotation of the shaft 366 which causes the segment 372' to open its circuit, and likewise the contact segment 372' is extended so as to keep its circuit closed when the segments 372 and 372a move in the direction to open their circuits.

These circuits containing the segment 372 and contacts 76 and 80, the segment 372a and contacts 76a and 80a, and the segment 372' and contacts 76' and 80' will be described below, suffice it to say here that they lead to the holding coils of the relay switch C shown in the diagram Fig. 6.

To indicate at the normal control station when the valve is closed and when it is open, there are provided pilot lights 90 and 91 which are controlled by automatic switches operated by the worm-shaft 21 (see Figs. 2, 4 and 5 of my prior patent). This automatic switch mechanism comprises a pair of cam disks 92 and 93, see Fig. 6, for controlling the pilot lights 90 and 91 respectively.

The gear train actuating the disks 92 and 93 is such that when the shaft 21 rotates for the full movement of the valve, less than a complete (approximately one-half) revolution is imparted to the cam disks 92 and 93.

The cam disks 92 and 93 are provided with spring-pressed followers 103, and the cam disks 92 and 93 are cut away so as to allow the followers to move toward the axes of the disks when the cut portion thereof lies adjacent the followers. The follower 103, which cooperates with the disk 92, is adapted to control a contact spring 105, while the follower 103, cooperating with the cam disk 93, is adapted to control a contact spring 106, the spring 105 cooperating with a contact point 107 and the spring 106 cooperating with a contact point 108, and the springs 105 and 106 being normally so biased as to disengage their respective contacts 107 and 108 when allowed to do so by their followers 103.

The contact spring 105 and contact 107 are adapted to control electrical circuits leading to the pilot light 91 which is green and which indicates that the valve is closed while the contact spring 106 and contact 108 control a circuit leading to the pilot light 90 which is red and which indicates that the valve is open, the cam disks 92 and 93 being so arranged with relation to the valve-disk that these respective switches are made operative when the valve disk is closed and opened. The circuits controlled by the contact springs 105 and 106 will be described below.

The valve control device of the present invention, in common with other valve controls heretofore provided, has a control station S which may be located in the vicinity of the valve or at a remote point, as desired. This valve control station S herein illustrated comprises a box 109 in which is mounted a valve-opening button 110, a valve-closing button 111, and a stop button 112, by means of which the valve may be brought to rest at any position which it may assume at the time the button 112 is depressed.

Cooperating with the control station S is the electromagnetic reversing switch or contactor C comprising a box 113 in which is mounted a solenoid 114 for controlling the circuits during opening of the valve and a solenoid 115 for controlling the circuits during closing of the valve. The solenoid 114 is provided with an armature 116 having contacts 117, 118 and 119, while the closing solenoid 115 is provided with an armature 120 carrying contacts 121, 122 and 123.

When the closing button 111 is pressed and the solenoid 115 is energized, the armature 120 is moved to bring its contacts 121, 122 and 123 into engagement with cooperating contact points therefor. As a result of this, current flows from a power-line L2 through the fields F of the motor 29, thence through wire 124 to the contact point 125, through the contact 123 to the contact point 126, through wire 127 connected to the brush terminals 128, through the armature A to the other brush terminal 129, through the wire 130 to the contact point 131, through the contact 122 on the armature 120 to the contact point 132, through the wire 133 to the junction 134 connected by the wire 135 to the other line L1 of the power-line. This causes the motor to rotate in the direction necessary to close the valve.

Should the button 110 be operated and its associated solenoids 114 be energized, the armature 116 will be moved so that its contacts 117, 118 and 119 are moved to circuit-closing positions. When this happens, current flows as before from the positive line L2 of the power-line through the field F and wire 124 to the contact point 125, where a wire 136 is connected with a contact point 137. Since the armature 116, as stated, is in its operative position, current then flows from the contact point 137 through contact 119 to contact point 138, then through wire 139 to contact point 131 joined with the wire 130 leading to the brush terminal 129, through the armature to the brush terminal 128, through wire 127 to contact 126 which is joined by a wire 140 to contact point 141, from which current flows through the contact 118 to a contact point 142 connected by a wire 143 to the junction 134. From the junction 134 current flows back through the wire 135 to the negative line L1 of the power-line.

It will be noted that in the circuit just described, the current flows through the armature in the opposite direction to that of the circuit previously described, and hence the motor will run in the opposite direction, that desired for opening the valve.

According to the present invention, there is also provided an emergency control station E which has associated with it pilot lights 90a and 91a in parallel with the lights 90 and 91 in the normal control station S. There is, however, only one button in the emergency station E, the button 111a, which initiates the operation of closing the valve.

To prevent effective operation of the normal control station S while the emergency station E is in use, the latter is provided with a switch D having two definite positions, in one of which the emergency closing button may not be effectively operated while the normal control station S has complete control of the mechanism. In the other position, the normal station is made inoperative while the valve may be closed only and solely by the operation of the button 111a.

To accomplish this, the main current supply wire 147 for the control mechanism does not lead directly to the normal control station S but, instead, goes to a contact 200 in the emergency station E. From there, current flows through the wire 210, contact 211, wire 218, contact 219, bridge-piece 212 of the switch D when the latter is in its normal position for normal station S operation, contact 220, wire 221 to a contact of the stop button 112 through which the current may flow to the junction 148 from which a wire 149 leads to a contact 145 of the closing button 111, and a wire 158 leads to a contact 159 of the opening button 110.

Assuming that the valve is open and that it is desired to close the same fully, the operator depresses the closing button 111 which has a contact 144 adapted to bridge contact points 145 and 146. When this is done, current flows from the junction 148, connected as above described to the positive line L2 of the power-line through the contact 144 to the contact point 146, thence through a wire 150 to a junction 151 which is connected to a wire 152 to the terminal 80 of the automatic normal valve-closing switch. At this point, current then flows from the terminal 80 through the contact point 372, terminal 76, wire 153 to the terminal 154 of the solenoid 115. The other terminal 155 of the solenoid 115 is connected by a wire 156 to a junction 157 connected to the wire 135 leading back to the negative line L1 of the power-line. As a result of the completion of this circuit, the armature 120 is moved to make its contacts 121, 122 and 123 operative with the result that the motor moves in closing direction, current flowing through the circuits above referred to.

At the same time, the contact 121 on the armature 120 closes a holding circuit including contacts H4 and H3, the former being connected by a wire 217 to a contact 202, wire 203, through junction 151 to the wire 152, and the contact H3 being connected by a wire 216, contact 215, bridgepiece 207 of the switch D, contact 222, wire H2, junction H10, wire H1 through junction 148, the stop button 112 and wire 221, switch D in the emergency closing station, contact point 200 to wire 147 which is connected to the positive power line L2, as described above.

The disk of the valve then descends toward its seat as the result of the operation of the valve-actuating mechanism. When the valve disc reaches its seat, or when it ceases to move, the resultant increase in load on the valve-actuating mechanism causes the worm-shaft 26 to overcome the pressure of the spring 45 and move endwise in the direction of the feathered arrow shown in Fig. 6. This causes the automatic switch mechanism to be operated so that the disk 369 removes the contact segment 372 from the terminal 80 and opens the circuit comprising wire 147 connected to the power-line L2 and its connections to the junction 148, wire H1, junction H10, wire H2, contact 222, bridge-piece 207, contact 215, wire 216, contact point H3, bridge-piece 121, contact point H4, wire 217, contact point 202, wire 203, junction 151, wire 152, contact 80, contact segment 372, contact 76, wire 153, terminal 154, solenoid 115, terminal 155, wire 156, junction 157, wire 135, which, it will be remembered, leads back to the negative power L1. As soon as the solenoid 115 is inoperative, which in normal operation takes place automatically upon breaking of the above circuit, its armature retracts moving its contacts 122 and 123 away from contact points 131, 132 and 125 and 126 respectively, thus opening the motor circuit and causing the motor to be rendered inoperative. At the same time, the contact 121 is moved away from the holding circuit contacts H3 and H4, so that when the contact segment 372 again moves into engagement with contact 80, as a result of the return of the worm-shaft 26 to normal position under the influence of spring 45, the described control circuit will remain open until the button 111 is again operated.

If it be desired at that time, in order to more tightly seat the valve or to send another surge of power through the valve-actuating mechanism to the valve, for any reason, this may be done merely by depressing the closing button 111 without first "backing-off" the valve, as is necessary with valve controls provided prior to my Patent No. 1,747,594. This is possible because, as soon as the motor is rendered inoperative, the pressure of the spring 45 will cause the worm 25 to screw through the teeth of the worm-wheel 24 and consequently move axially and remake the stopping switch comprising the contact 80, contact segment 372 and contact 76.

To open the valve, the button 110 is depressed. This closes the control circuit comprising wire 147 connected to the power line L2 and its connection to stop button 112 and junction 148, a wire 158, a contact point 159, a contact 160 on the button 110, a contact point 161, a wire 162, a junction 163, a wire 164, contact 80', contact segment 372', contact 76', wire 165, junction 166, wire 167, terminal 168 of the solenoid 114, terminal 169, wire 170, junction 157, wire 135 leading to the negative power line L1. As the result of the closing of this circuit, the armature 116 of the solenoid 114 is caused to move its contacts 118 and 119 to position to close the motor circuit so that the motor rotates in the valve-opening direction.

At the same time the contact 117 closes a holding circuit comprising contacts H6 and H7, the former being connected to wire 162 and the latter being connected to a wire H9 having a junction H10 with the wire H1 which, through junction 148, the stop-button 112 and its connection through the switch D to wire 147 leading to the positive power line L2. Thus, the control circuit may be automatically held closed while the button 110 is manually released and allowed to return to circuit-opening position shown in Fig. 6.

As pointed out in my Patent No. 1,747,594, experience has shown that more power is required in starting to open the valve than used to seat the valve. Consequently, it would seem necessary that the spring 44, which resists axial movement of the worm-shaft 26 when the parts are moved in valve-opening direction, should be stiffer or more resistant than the spring 45. But, it is not desirable that this be done, for, if the spring 44 were made stiffer than the spring 45, then the shoulder on the valve-stem would engage the bonnet bushing with so much force as to damage the same. The shoulder would be jammed so hard against the bonnet bushing that the spring 45 would then have to be stronger than the spring 44 in order to start the valve in closing direction. Consequently, if the spring 44 were made stiffer than the spring 45, the result of seating the shoulder of the valve-stem gently against the bonnet bushing could not be accomplished.

To accomplish this result and yet allow the motor to apply sufficient torque to the valve-actuating mechanism during the initial opening movement of the valve, the present invention provides the spring 44 with less tension than the spring 45, and further provides a stop collar 175 preferably formed integral with the sleeve 49 (see Fig. 1). This stop collar 175 is so arranged that, when the motor 29 commences to turn in valve-opening direction, the torque of large magnitude, which is required to unseat the valve, will cause the worm-shaft 26 to move in the direction of the tailless arrow, Fig. 1. This will bring the anti-friction thrust bearing 47 against the end of the stop-collar 175 with the result that the full torque of the motor may be applied to the valve-actuating mechanism to crack the valve.

When the power required to continue the upward movement of the valve diminishes, as it does as soon as the valve is out of the seat, the spring 44 moves the worm-shaft 26 axially until the desired balance between the normal load resistance of the valve-actuating mechanism and the tension of the spring 44 causes the shaft to again assume a substantially neutral position approximating that shown in Fig. 1.

As the shoulder on the valve-stem comes in contact with the bonnet bushing, the resistance or load on the valve-actuating parts again increases, and this causes the worm-shaft 26 to move in the direction of the tailless arrow causing the shaft 366 (see Fig. 6) to rock clockwise with the result that the segment 372' moves from under the contact 76' and opens the circuit between the latter and the contact point 80'. This results in the motor being rendered inoperative by cutting off its supply of current. It will be remembered that the shaft 26 moves endwise at the initial opening or cracking of the valve. This movement too is sufficient to operate the segment 372' to open the circuit including the contacts 76' and 80'. But, at this time, it is not desired that the motor be rendered inoperative, for the valve has only started to move in opening direction. For the purpose of rendering this automatic switch inoperative during the initial opening or cracking of the valve, the present invention provides a circuit and automatic switch adapted to short circuit the switch 76' and 80' during this initial cracking of the valve. Clearly, it is preferable that such a switch be controlled by the position of the valve, and the switch normally used to control the pilot lights is employed for this purpose.

Accordingly, the cam disk 92 which controls the green or closing pilot light 91 operates a spring contact 176 which is in addition to the spring contact 105 which controls the pilot light 91. This spring contact 176 is connected by a wire 177 to the junction 166 leading through the wire 167, terminal 168 to the solenoid 114 and being the same junction from which the wire 165 leads to the contact 76' of the automatic opening switch, the contact spring 176 cooperating with a contact point 178 connected by a wire 179 to a junction 163 that leads to the other terminal 80' of the automatic switch 76' and 80'. Thus it will be seen that when the contact spring 176 is in its operative position, as shown in Fig. 6, the circuit through the solenoid is held closed in spite of the fact that the switch 76' and 80' might be opened by operation of the shaft 366 and disk 369 as a result of endwise movement of the worm-shaft 26. As the valve-disk approaches its open position, the follower 103 for the cam 92 enters the cut-away portion in the cam allowing the spring contact 176 to move away from the contact point 178. This restores the control circuit to the condition in which it was when the opening button 110 was first operated.

Hence, when the shoulder on the valve-stem engages the bonnet bushing, the valve-actuating train ceases to move, the spring 44 yields, and the worm-shaft 26 moves axially causing the disk 369 and its segment 372' connected therewith to open the control circuit. This causes the solenoid 114 to be deenergized and allows the armature 116 to move its contacts 117, 118 and 119 away from their cooperating contact points, with the result that the motor is no longer supplied with power and consequently stops.

Of course, at the same time that the follower 103 enters the cut-away portion of the cam-disk 92, the circuit controlled by contact spring 105 and contact point 107 leading to the green pilot lights 91 and 91a is interrupted with the result that the lights no longer glow, indicating that the valve is opened. In the same manner, when the valve approaches its closed position, the follower 103 of the cam-disk 93 allows the spring contact 106 to move away from its cooperating contact point 108 to open the circuit through the red or open pilot lights 90 and 90a. It will also be noted that during the intermediate stages of movement between the closed position and the open position, lights of both colors glow apprising the operator of the fact that the valve is neither open completely nor closed completely.

The closing operation above described was that normally employed for closing the valve in a balanced line, and the switch comprising the segment 372 and contacts 76 and 80 is set so that the valve disk will not be forced into its seat with excessive pressure before the motor is rendered inoperative, and as the setting is such that the motor control circuit would be opened if an attempt was made to close the valve against one-sided fluid pressure against the valve disk, the latter must be provided for, for emergencies might arise requiring that the valve be quickly and surely closed even with unbalanced pressure on the disk.

To permit this to be done, the present invention provides the emergency valve closing station E, which is usually located at a point remote from both the valve and the normal station S.

Figure 4:
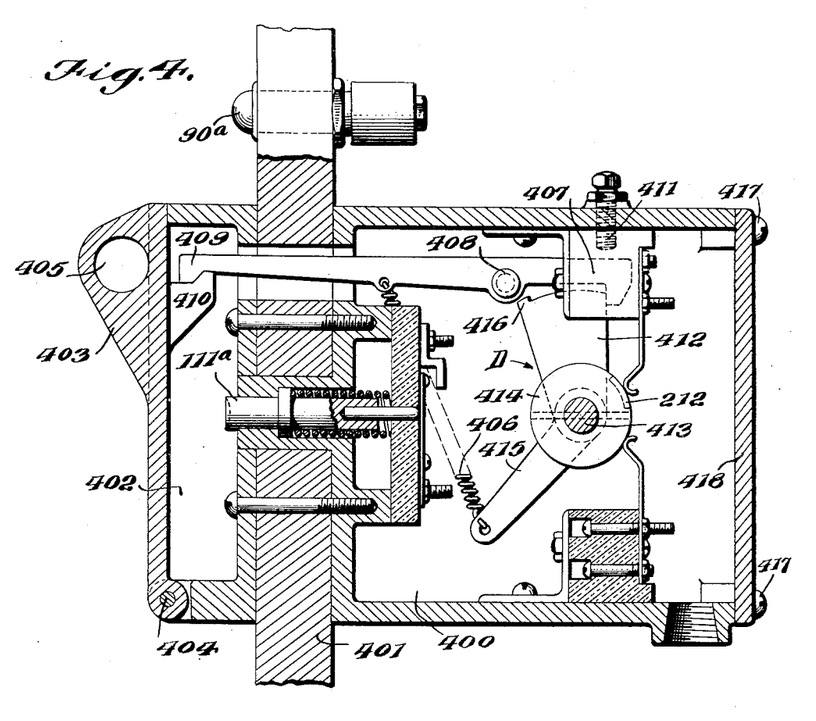
Fig. 4 is a sectional view through the emergency station provided by the present invention.
Figure 5:
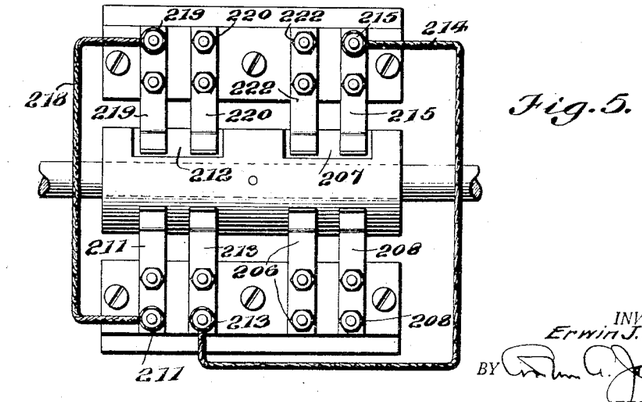
Fig. 5 is a detail view showing the switch which takes the control of the valve away from the normal station when the emergency station is in operation.

This emergency station E is preferably located in a locked room and, as shown in Figs. 4 and 5, is located in a box 400 mounted on a panel 401 through which the emergency closing button 111a protrudes into a chamber 402 normally closed by a door 403 hinged at 404 and having a finger hole or ring 405 by means of which it may be swung open. The opening of the door 403 automatically operates the switch D which, as above stated, is adapted to render the normal control station S ineffective to control the valve when it is desired to close the valve from the emergency station. This is accomplished by providing a spring 406 on the switch D which normally tends to move it from the dotted line position shown in the diagram Fig. 6, to the full line position therein, and by providing a catch 407 which normally holds the switch D in normal station operating position, the catch 407 being pivoted at 408 and having its forward end 409 normally engaged with a lug 410 on the door 403. The lugs 409 and 410 are provided with cooperating surfaces so that the catch normally holds the door closed. When the door is pulled open, the lug 409 is raised and then allowed to drop under the action of the spring 406 until the catch engages the stop 411. In so moving, the catch releases an arm 412 secured to a shaft 413 carrying a drum 414 of insulated material in which the bridge pieces 207 and 212 are inserted and allows the drum to rotate under the influence of the spring 406 which is connected to an extension 415 of the arm 412 until a lug 416 on the arm 412 engages the end of the catch 407.

During this movement of the drum, the bridge pieces 207 and 212 are moved from their normal positions where they engage contacts 215 and 222, and 219 and 220 respectively, to the positions where they engage the contacts 206 and 208, and 211 and 213 respectively, some of which have been above referred to and the others of which will be identified below.

Thus it will be seen that the present invention provides the emergency station with a switch D which must be shifted from normal to emergency setting as an incident to or prerequisite of the operation of the emergency closing button 111a.

The resetting of the switch D and the restoration of the normal station to valve-controlling condition should only be performed upon the order of a person in high authority who has first satisfied himself that the cause for the emergency has been corrected or obviated, or, at any rate, that the conditions are such that control of the valve may be returned to the normal station.

For these reasons, no means are provided for facilitating the resetting of the switch D and, in fact, the present invention makes it necessary for two people to participate in the operation of resetting, and even then the operation is not so simple that it could be inadvertently or thoughtlessly performed.

To reset the automatic switch D, it is necessary for one person to go behind the panel board 401 and remove screws 417 holding on the cover plate 418 and then reaching in the box 400 pull the arm 415 rearwardly toward himself and, at the same time, hold the catch 407 down on the arm 412 while the other person closes the door 403 which is then yieldingly held in closed position by the cooperating lugs 409 and 410 on the catch and door, respectively.

To close the valve under emergency conditions, the door 403 of the emergency station is opened as above described and the button 111a is depressed. This causes current to flow from the contact 200 which is connected by the wire 147 to the positive line L2, through a bridging piece 201 to a contact 202, from there through wire 203, junction 204, wire 205, contact 206, bridging piece 207 of the switch D, contact 208, wire 152a to the contact 80a of the switch controlled by the end-thrust movement of the worm-shaft 26; then through the segment 372a on the disk 369, contact 76a, wire 153a to the junction 209 of the circuit for the solenoid 115 which includes the wire 153, terminals 154 and 155, wire 156, junction 157 and wire 135 to the negative side of the line.

When the initiating circuit above described is thus closed, the armature 120 is moved to its operative position to cause the motor to operate in valve-closing direction and, at the same time, to cause the bridging piece 121 to close the holding circuit which is as follows: wire 147 connected to the positive side L2, contact 200, wire 210, contact 211, bridging piece 212, contact 213, wire 214, contact 215, wire 216, contact H3, bridging piece 121 on armature 120, contact H4, wire 217, contact 202, wire 203. From this point there are two branches to the circuit, one branch including the junction 151, wire 152, normal closing switch 80—372—76, wire 153 to the junction 209 through which current may flow until the normal closing switch 80—372—76 opens when the normal torque limit is reached even when closing with the emergency button 111a. The other branch of the emergency holding circuit includes a junction 204, wire 205, contact 206, bridging piece 207, contact 208, wire 152a to the emergency closing automatic switch 80a—372a—76a, wire 153a to the junction 209.

At this point, both branches of the circuit again join and continue to the negative side of the line through wire 153, terminal 154, solenoid 115, terminal 155, wire 156, junction 157 to the wire 135 leading to the negative line L1.

When the torque applied by the motor to the valve-actuating mechanism reaches a predetermined value greater than that which may be applied in normal closing and depending upon the fixed setting of the segment 372a carrying contacts 76a and 80a, the end-thrust movement of the worm-shaft 26 will have rotated the disk 369 carrying the segment 372a so that the end of the segment goes beyond the contact 80a and thereby opens the holding circuit including the solenoid 115 by forming a gap in the branch circuit including wires 152a and 153a, the other branch of the holding circuit including the wires 152 and 153 having been broken previously when the segmental contact 372 passed beyond the contact 80. When the holding circuit is broken, the armature 120 returns to its normal position and opens the motor circuit.

From the above, it will be noted that in emergency closing, current flows through both the branch of the circuit including the normal closing switch 76—372—80 and wires 152 and 153 and through the emergency closing switch 76a—372a—80a and the wires 152a and 153a, and even if any one of these circuits for any reason was out of order, the closing movement of the valve would be initiated. The holding circuits being similarly arranged, the valve would at least partly close even if the emergency closing circuit were out of order.

Variations and modifications may be made within the scope of this invention and portions of the improvements may be used without others.

Having thus described the invention, what is claimed as new and for which it is desired to obtain Letters Patent, is:—

1. In a valve control having valve-actuating mechanisms and a motor therefor, torque-responsive means actuated by said motor for rendering the motor temporarily inoperative to apply power to the valve-actuating mechanism upon cessation of movement of the valve; and means cooperating with the torque-responsive means for permitting the motor to apply to the valve-actuating mechanism a plurality of different seating torques and a plurality of different opening torques before the motor is rendered inoperative by said torque-responsive means.

2. In a valve opening and closing device having valve-actuating mechanism and a motor therefor; means for automatically seating the valve with the desired pressure and for normally rendering the motor temporarily inoperative to apply power to the valve-actuating mechanism when said motor applies a predetermined torque thereto which is sufficient under normal conditions to obtain said desired seating pressure; means for permitting the motor to apply torque to the valve in excess to said predetermined torque but less than full motor torque when moving the valve toward its seat; means for causing the valve to be moved into engagement with a bonnet bushing therefor with a predetermined pressure; and automatic means operative before the valve reaches the bonnet bushing for permitting the motor to apply torque to the valve in opening direction in excess of that sufficient to obtain the said predetermined pressure between the valve and bonnet bushing.

3. In a valve opening and closing device having valve-actuating mechanism and a driving motor therefor; means for automatically controlling opening and closing movements of the valve by said motor and valve-actuating mechanism and for automatically determining the extents of movement of the valve in both closing and opening directions, said means including means permitting the motor to apply two quantitatively different torques to the valve-actuating mechanism in valve-opening direction; and means for permitting the motor to apply optionally either of two quantitatively different seating torques to the valve-actuating mechanism in valve-closing direction.

4. In a valve opening and closing device having valve-actuating mechanism and a driving motor therefor; means for automatically controlling opening and closing movements of the valve by said motor and valve-actuating mechanism and for automatically determining the extents of movement of the valve in both closing and opening directions, said means including a motor control circuit, means responsive to the torque applied by the motor to the valve-actuating mechanism, switch mechanism operated by said means, a normal control station adapted to close said motor control circuit, said motor control circuit including said switch operated by the torque-responsive means, and an emergency station including means independent of the said torque responsive switch for causing the motor circuit to be closed to cause the valve to move in closing direction; and means controlled from the emergency station for rendering the normal control station inoperative preparatory to the operation of the valve by the emergency station.

5. In a valve opening and closing device having valve-actuating mechanism and a driving motor therefor; means for automatically controlling opening and closing movements of the valve by said motor and valve-actuating mechanism and for automatically determining the extents of movement of the valve in both closing and opening directions, said means including a motor control circuit, means responsive to the torque applied by the motor to the valve-actuating mechanism, switch mechanism operated by said means, a normal control station including manually operable switch mechanism adapted to close said motor control circuit, said motor control circuit including said switch operated by the torque-responsive means, and an emergency station including means for causing the motor circuit to be closed to cause the valve to move in closing direction, and a switch at the emergency station rendering the normal control station including the manually operable switch mechanism inoperative.

6. In a valve opening and closing device having valve-actuating mechanism and a driving motor therefor; means for automatically controlling opening and closing movements of the valve by said motor and valve-actuating mechanism and for automatically determining the extents of movement of the valve in both closing and opening directions, said means including a motor control circuit, means responsive to the torque applied by the motor to the valve-actuating mechanism, switch mechanism operated by said means, a normal control station adapted to close said motor control circuit, said motor control circuit including said switch operated by the torque-responsive means, and an emergency station including means for causing the motor circuit to be closed to cause the valve to move in closing direction, and a switch at the emergency station rendering the normal control station inoperative, said switch being automatically operated as an incident to the use of the emergency station.

7. In a valve control, valve-actuating mechanism and a motor therefor; and means for controlling the motor including an emergency station having a door, a push-button normally made inaccessible by the door for controlling the closing of the valve, and an auxiliary switch operated by the door when moving to give access to the push-button for operatively connecting the push-button to the motor control circuit.

8. In a valve control, valve-actuating mechanism; a motor therefor; a normal control station adapted to control the opening and closing of the valve by the motor; an emergency station adapted to control the closing of the valve under emergency conditions; and means operated as an incident to the operation of the emergency station in preparation for control of the valve by the emergency station for rendering the normal control station inoperative to control the opening movements of the valve and in advance of the operation of the valve by the emergency station.

9. In a valve control, valve-actuating mechanism; a motor therefor; a normal control station adapted to control the opening and closing of the valve by the motor; an emergency station adapted to control the closing of the valve under emergency conditions; and means operated as an incident to the operation of the emergency station in preparation for control of the valve by the emergency station for rendering the normal control station inoperative to control the valve and in advance of the operation of the valve by the emergency station.

10. In a valve control, valve-actuating mechanism; a motor therefor; a normal control station adapted to control the opening and closing of the valve by the motor and the stopping of the valve; an emergency station adapted to control the closing of the valve under emergency conditions; and means operated as an incident to the operation of the emergency station and in advance of the operation of the valve by the emergency station for rendering the normal control station inoperative to control the closing movements or stopping of the valve.

11. In a valve control, valve-actuating mechanism; a motor therefor; a station having means for stopping movements of the valve under power of said motor and valve actuating mechanism; another station adapted to control movement of the valve; and means operated as an incident to the operation of the second-named station and in advance of the operation of the valve by the emergency station for rendering the first-named station inoperative to stop the valve.

12. In a valve control having valve-actuating mechanisms and a motor therefor, torque-responsive means actuated by said motor for rendering the motor temporarily inoperative to apply power to the valve-actuating mechanism upon cessation of movement of the valve; and means cooperating with the torque-responsive means for permitting the motor to apply to the valve-actuating mechanism a plurality of different seating torques and a plurality of different opening torques before the motor is rendered inoperative by said torque-responsive means, and the closing torques being manually selected.

13. In a valve control having valve-actuating mechanisms and a motor therefor, torque-responsive means actuated by said motor for rendering the motor temporarily inoperative to apply power to the valve-actuating mechanism upon cessation of movement of the valve; and means cooperating with the torque-responsive means for permitting the motor to apply to the valve-actuating mechanism a plurality of different seating torques and a plurality of different opening torques before the motor is rendered inoperative by said torque-responsive means, the opening torques being automatically selected and the closing torques being manually selected.

ERWIN J. PANISH.